E. GERSTENBERG.
PUMP.
APPLICATION FILED MAR. 21, 1911.
1,034,358.
Patented July 30, 1912.
4 SHEETS—SHEET 1.
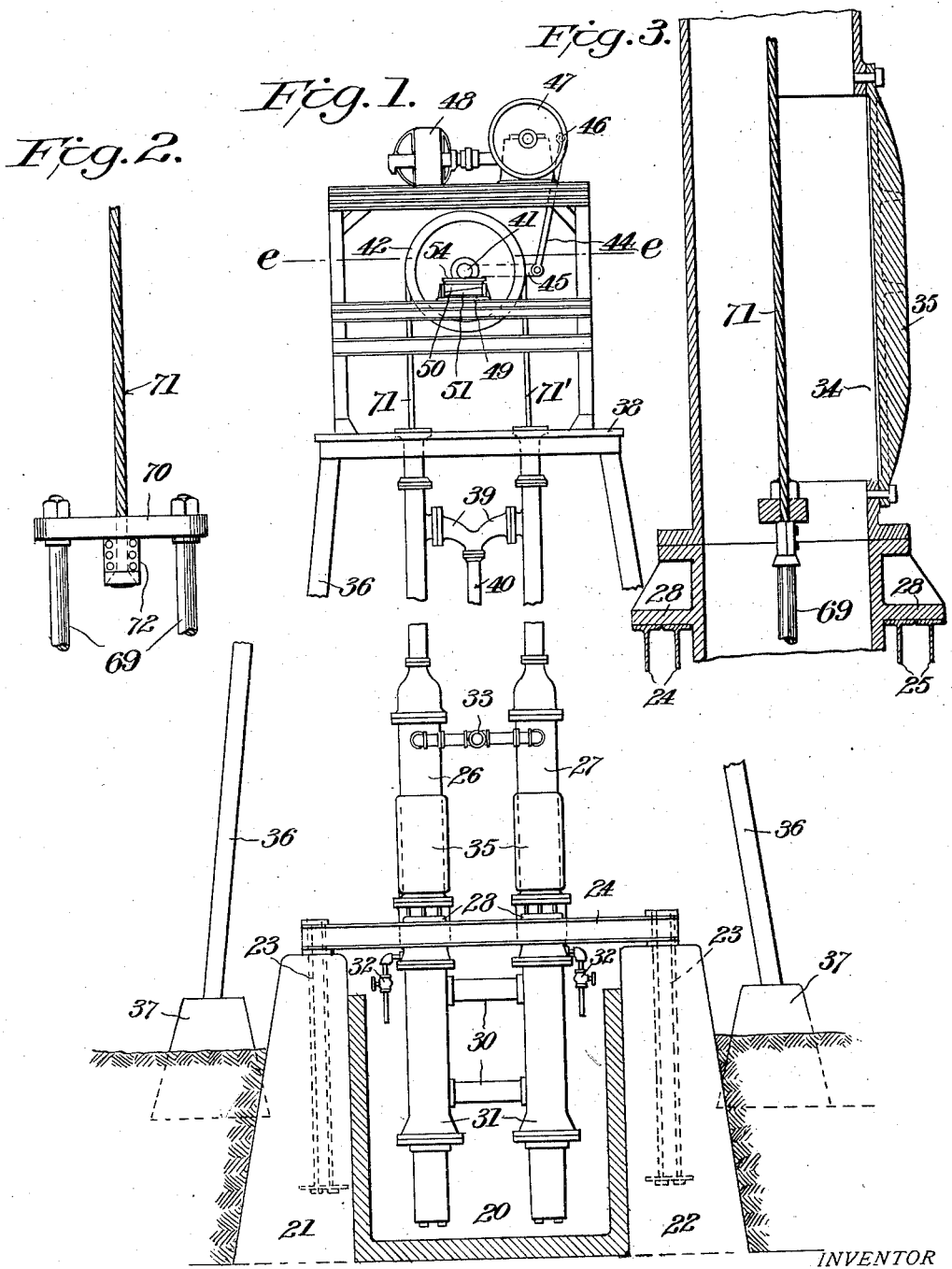
WITNESSES
INVENTOR
Ernst Gerstenberg.
Attorney

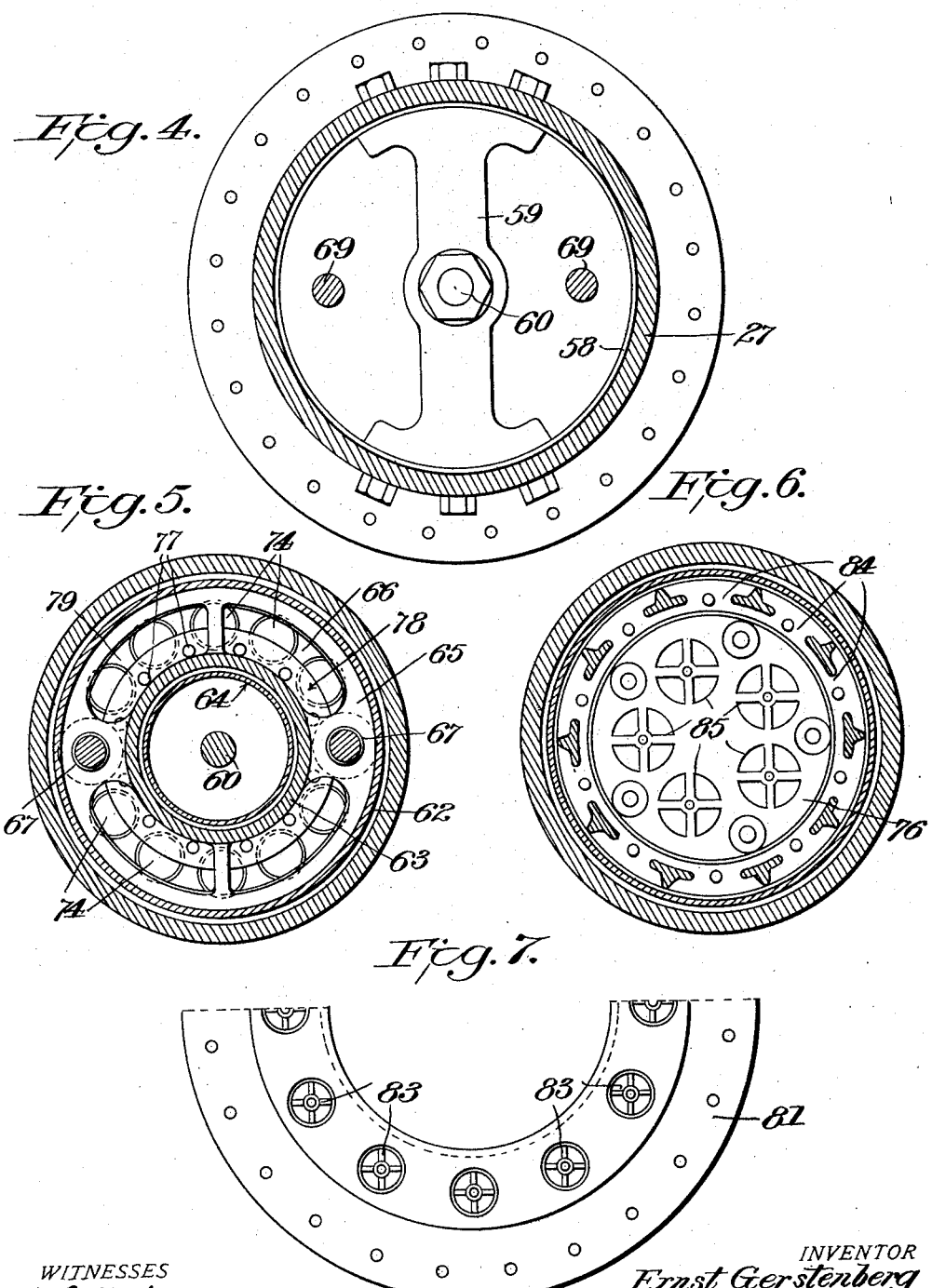

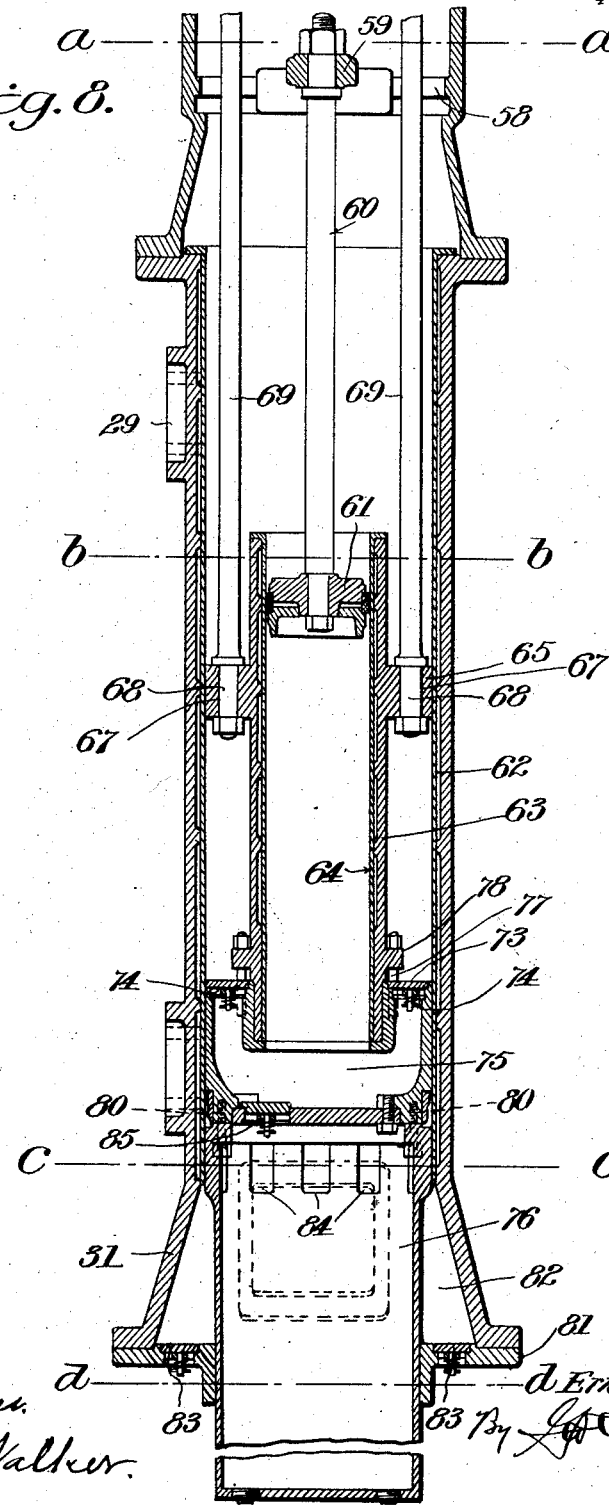

E. GERSTENBERG.
PUMP.
APPLICATION FILED MAR. 21, 1911.
1,034,358.
Patented July 30, 1912.
4 SHEETS—SHEET 4.
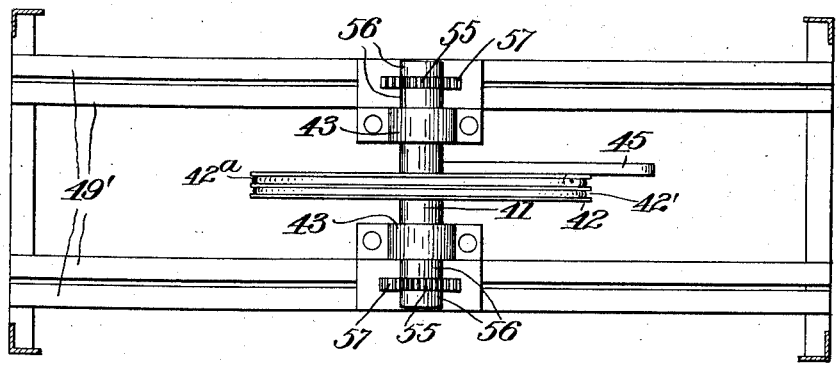
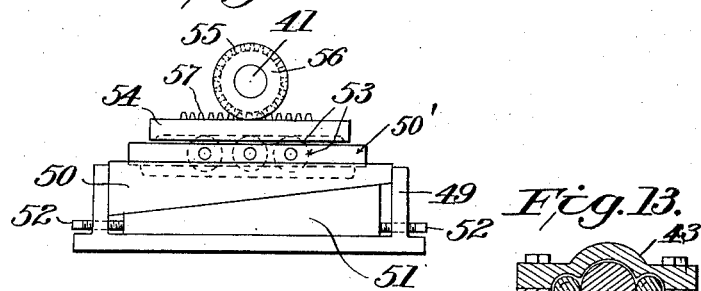
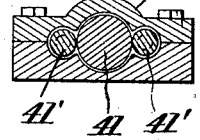
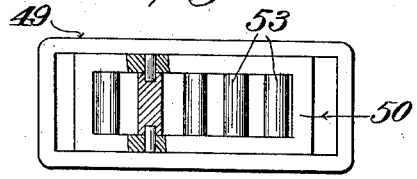
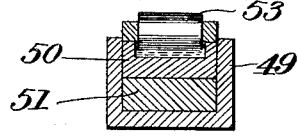

UNITED STATES PATENT OFFICE.

ERNST GERSTENBERG, OF WASHINGTON, DISTRICT OF COLUMBIA.

PUMP.

1,034,358.  Specification of Letters Patent.  Patented July 30, 1912.

Application filed March 21, 1911. Serial No. 616,009.

*To all whom it may concern:*

Be it known that I, ERNST GERSTENBERG, a citizen of the United States, residing at Washington, in the District of Columbia, have invented certain new and useful Improvements in Pumps, of which the following is a specification.

This invention relates to pumps.

One object is to provide a pump embodying a casing and a working cylinder in the casing with means coöperating with the casing and the cylinder whereby the amount of water discharged from the casing is in accordance with the stroke of the working cylinder and whereby the amount of water discharged from the working cylinder is replenished, according to the amount of water discharged therefrom, the displacement of the water in the replenishing means being preferably exactly equal to the displacement of the water in the working cylinder.

Another object resides in the provision of a pump including a casing having a working cylinder therein, in combination with a valved pulsation chamber having valved communication with the working cylinder so that on the up stroke of the cylinder the pulsation chamber will receive a quantity of water sufficient to supply the working cylinder with the amount of water discharged from the latter on its up stroke, the displacement of water in the pulsation chamber being preferably exactly equal to the displacement of water in the working cylinder, so that the pulsation chamber always contains preferably the exact quantity of water required to fill the cylinder.

Another object is to provide a pump embodying a casing having a working cylinder therein and carrying a drum or trunk which coöperates with the casing to provide a pulsation chamber and also a passage between the pulsation chamber and the working cylinder, there being a valve in said passage which opens on the down stroke of the cylinder with the passage not only coöperating with the casing to form a pulsation chamber but also coöperating therewith to prevent the displacement of water on the down stroke of the cylinder from the pulsation chamber back into the well, whereby the water in the pulsation chamber which is led thereinto on the upstroke of the cylinder is compelled to enter the cylinder on the down stroke and not be permitted to go back into the well, and whereby the cylinder is shielded from the water that surrounds the casing on the down stroke thereof.

A still further object is to provide a pump having a casing and a cylinder therein by which the column of water in the casing is supported with means whereby the amount of water discharged from the casing on the up stroke of the cylinder is substantially equal to the amount of water discharged from the cylinder, there being means provided for coöperation with the casing and the cylinder and operable to supply the latter with water on the down stroke of the cylinder substantially equal to the quantity of water discharged therefrom, whereby an efficient balance of the pump is obtained and friction reduced to a minimum.

With the above and other objects in view the present invention consists in the combination and arrangement of parts hereinafter more fully described, illustrated in the accompanying drawings, and particularly pointed out in the appended claims.

In the drawings:—Figure 1 is an elevation of the invention, the well being shown in section. Fig. 2 is a detail fragmentary elevation of the head to which the cables are connected at their lower ends. Fig. 3 is an enlarged detail vertical sectional view through a portion of one of the casings showing the openings through which access may be had to the casing. Fig. 4 is a cross sectional view on the line $a$—$a$ of Fig. 8. Fig. 5 is a cross sectional view on the line $b$—$b$ of Fig. 8. Fig. 6 is a cross sectional view on the line $c$—$c$ of Fig. 8, looking upward. Fig 7 is a fragmentary cross sectional view on the line $d$—$d$ of Fig. 8, looking upward. Fig. 8 is an enlarged vertical sectional view through the lower end of the casing, illustrating the working parts of the pump. Fig. 9 is a sectional view on the line $e$—$e$ of Fig. 1. Fig. 10 is a detailed face view of the adjustable bearing for the shaft of the sheave. Fig. 11 is a top plan view of the bearing with the sliding plate removed. Fig. 12 is a transverse sectional view of the bearing with the sliding plate removed. Fig. 13 is a transverse sectional view through one of the sheave shaft bearings.

Referring now more particularly to the accompanying drawings, the reference character 20 indicates a well, adjacent which are disposed concrete or other piers 21 and 22, there being uprights 23 embedded in the piers 21 and 22 for the support of the spaced beams 24 and 25 on which the casings 26 and 27 are mounted, the casings each having flanges 28 on opposite sides, forming feet for engagement with the tops of the beams to firmly support the casings. If desired, the casings may be provided with sockets 29 adapted to receive the spacing supports 30.

The casings 26 and 27 may be of any desired length and the foot portions thereof are preferably deflected annularly as at 31 for a purpose presently explained, with each casing provided with a valved drain 32, preferably at the top of the well and a valved drain 33 some distance above the well, there being an opening 34 in each casing 26—27 closed normally by the closure 35, this opening permitting access to the casings if desired.

The character 36 indicates legs mounted in the concrete or other abutments 37 and on the top of these legs is supported a top member 38 up to which the upper ends of the casings 26 and 27 preferably extend, each casing having an elbow 39 in proximity to its upper end with the elbows leading into a common outlet 40 which may lead to any suitable source to deliver water from the well for any desired purpose.

A second frame-work is disposed on the top 38 in which is journaled on the shaft 41 a sheave 42 which latter is oscillated in its bearings 43 by virtue of the pitman connection 44 pivoted at one end to the arm 45 on the sheave 42 and pivoted eccentrically at its opposite end, as at 46, to the wheel 47 driven by the electric or other motor 48.

The sheave 42 and its shaft 41 are mounted in a way designed to reduce friction to a minimum and one specific form of mounting may consist in a boxing 49 disposed on the rails 49' on each side of the sheave 42 in each of which boxes is mounted the opposing wedge-shaped members 50 and 51, the wedge-shaped member 51 being adjusted by the manipulation of the screws 52 whereby the wedge-shaped member 50 may be raised or lowered. The wedge member 50 is preferably hollow and adapted to receive oil for the lubrication of the spaced rollers 53 mounted in the frame 50' and on which rollers the plate 54 rides under the influence of the teeth 55 on the bearings 56 meshing with the teeth 57 on the plate 54. If desired, the roller bearings 41' may be disposed against opposite sides of the shaft 41 to obviate lateral strain on the shaft. Thus, when the sheave is oscillated the shaft 41 is relieved of considerable strain incident to its peculiar mounting.

Secured in any suitable manner in each casing 26—27, preferably on the shoulder 58 is a support 59 to each of which, intermediate the ends thereof, is secured in any suitable manner the rod 60 of the plunger head 61, whereby there is mounted in each casing a fixed or immovable head, which is suspended within the respective casing.

Each casing is preferably provided with a suitable lining 62 and embracing each plunger head 61 is a working cylinder 63 also preferably provided with a suitable lining 64. The working cylinder is preferably open-ended and is mounted for reciprocation in embracing relation with the respective head 61, there being an annular flange 65 formed exteriorly on each working cylinder and provided with substantially segmental slots 66 to permit of the flow of water or other fluid therethrough and having apertures 67 in which are secured in any suitable manner the lower ends 68 of the pairs of rods 69 which extend upwardly in the respective casing from said flange 65 and which have their upper ends connected in any suitable manner to a suitable cross-piece 70. Each cross-piece 70 has an opening through which is passed the lower end of the respective cables 71—71' and into a suitable rope clamp 72 in which latter the lower ends of the cables 71—71' may be fixed securely in any suitable manner. The upper ends of the cables 71—71' are secured in the corresponding groove 42'—42ª in the sheave 42 in any suitable manner, and whereby, upon oscillation of the sheave, the cylinders 63 may be reciprocated by virtue of the said connections between the sheave and the cylinders.

The rods 69 are out of contact with the casing or with the horizontal support 59, whereby no friction at all is manifest on the rods, they being movable freely through the column of water in the casings above the valves 73 mounted over the plurality of outlets 74 at the upper end of the combined inlet and outlet chamber 75.

The combined inlet and outlet chambers 75 are secured to the respective cylinders 63 in any suitable manner, one form of means residing in the bolts 77 which are passed through the annular flange 78 on each cylinder and through the top of the combined inlet and outlet chambers 75. The combined inlet and outlet chambers are annular in formation and their outer surfaces engage snugly within the casings 26—27 or within the linings that may be provided for the casings and perform the function of pistons for a purpose presently explained.

A drum or trunk 76 is connected to each combined inlet and outlet chamber 75 preferably by the bolts 80. Each drum or passage 76 extends through the foot 31 of the casing and together with the deflected portion of the foot of the casing and the bottom plate 81, it forms a pulsation chamber 82, each pulsation chamber 82 receiving water through the foot valves 83 on the up stroke of the cylinder by virtue of piston action of the respective combined inlet and outlet chamber 75. The drum or trunk 76 has its annular upper portion provided with external ribs adapted to engage the inner surface of the casing to reduce friction and to provide spaces for the passage of water from the pulsation chamber to the drum or trunk 76 by way of the openings 84 in the latter, whereby there is constant communication between the trunks or drums 76 and the pulsation chambers.

The quantity of water which is taken into the pulsation chamber through the valves 83 on the up stroke of the cylinder is preferably the quantity of water displaced by the pump on each up stroke of the working cylinder and is preferably the exact contents of the working cylinder, whereby the pulsation chamber always contains preferably the exact quantity of water required to fill the cylinder on the down stroke of the latter.

When the engine 48 is started, the wheel 47 is caused to rotate and by reason of the pitman connection 44 with the arm 45 on the sheave 42, the sheave is caused to oscillate, and this oscillatory movement causes reciprocation of the cylinders in their respective casings incident to the cable connections 71—71′ between the cylinders and the sheave 42 as should be well understood. Thus as one cylinder 63 lowers, the other rises so that there is an alternate discharge of fluid from the cylinders. While one cylinder is discharging the other is being supplied with fluid and on the down stroke, i. e., when each cylinder is receiving fluid, the column of water in the respective casing stands on the valves 73 and maintains them closed; whereas, on the up stroke, said valves open, as will be explained.

In Fig. 8, it will be assumed that the cylinder 63 is full of water. The engine being in operation, the cylinder 63 will be lifted as will also the combined inlet and outlet chamber 75 and the passage 76 because the latter two elements are connected together and the former element connected to said cylinder 63. The head 61 being fixed and slidably embraced by the cylinder, the fluid in the cylinder must escape under this up stroke of the cylinder. This operation causes the fluid in the cylinder to be discharged. The valve openings 85 are closed on such discharge from the cylinder. When the discharge of fluid is effected through the pipe 40, that is, on the upward movement of the cylinder 63, the combined inlet and outlet chamber 75 being carried upward with the cylinder 63, causes flow of fluid into the pulsation chamber 82 through the valves 83 and the discharge of the fluid from the cylinder lifts the valves 73, which latter are normally closed by the column of water supported by the combined inlet and outlet chamber 75 and acts against the column of water surrounding the cylinder above the combined inlet and outlet chamber and by reason of the pressure exerted upon the column by the discharge from the cylinder there is a resultant discharge of water at the top of the casing through the supply elbow 39 and out of the pipe 40. The quantity of water discharged from the pipe 40 is substantially equal to the amount of water discharged from the cylinder.

When the lower end of the cylinder 63 is adjacent the fixed head 61, that is to say, when the cylinder has reached the limit of its up stroke, the cylinder in the other casing will begin to operate in the manner just described. The cylinder in the casing 27 now begins to move downward with the result that water in the pulsation chamber 76 passes up through the valved inlets 85 of the combined inlet and outlet chamber 75, and the valves 73 being held closed by the column of water above them, the charge from the pulsation chamber enters the cylinder by way of the drum or trunk 76, the openings 84 in the latter and the valved openings 85.

The downward movement of the cylinder cannot push the water back into the well because the foot valves 83 and the drum or trunk 76 prevent this; hence, the water in the pulsation chamber is obliged to flow into the cylinder in the manner hereinbefore described. As the area of the annular space between the drum, trunk or passage 76 and the casing is preferably exactly equal to the area of the cylinder, the pulsation chamber always contains substantially and preferably the exact quantity of water required to fill the cylinder.

I thus provide a pump embodying such characteristics that the discharge of water from the pump is commensurate with the amount of water discharged from the cylinder with means provided whereby the cylinder may be supplied with water according to the amount it discharges, the means for providing for such a supply of water to the cylinder having an area preferably exactly equal to the area of the cylinder. These characteristics are brought about by providing the drum or trunk for coöperation with the foot of the casing to form the pulsation chamber and to also form a passage between the pulsation chamber and the cylinder 33, the drum or trunk performing the further function of providing means for coöperation with the foot valves 83 to prevent the water in the pulsation chamber from being forced back into the well on the down stroke of the cylinder and insuring passage of water from the pulsation chamber to the cylinder through the valved passage formed by the trunk or drum and the valved openings 85. In other words, communication between the well and the casing is cut off on the down stroke of the cylinder so as to compel the water in the pulsation chamber to go to the cylinder on the down stroke thereof rather than back into the well. Thus the water to replenish the cylinder is not taken directly from the well on the down stroke of the cylinder 63 but it is first taken from the well on the up stroke of the cylinder into the pulsation chamber or the drum or trunk or both where it is confined until the cylinder operates on its down stroke when the water is delivered from the pulsation chamber to the cylinder, whereby the cylinder is shielded from the water that surrounds the casing on the down stroke thereof. Thus, by virtue of the drum or trunk 76, I take into the pulsation chamber on the down stroke of the cylinder just sufficient water to charge the cylinder on its down stroke according to the amount of discharge from the cylinder on its up stroke, or in other words, the distance the cylinder travels.

By my peculiar construction and arrangement of parts, I am enabled to operate my pump in wells where the water varies in depth, for, irrespective of the depth of the water, so long as the foot valves are submerged in the water, the pump operates to lift the water in the manner herein described.

What is claimed is:—

1. The combination of a casing, a fixed head in the casing, a reciprocating cylinder embracing said head, a pulsation chamber, a passage connecting the pulsation chamber with said cylinder and having constant communication with the pulsation chamber, a check valve leading from the cylinder, and a check valve in said passage.

2. The combination of a casing, a fixed head in the casing, a reciprocating cylinder embracing said head, a pulsation chamber, a passage connecting the pulsation chamber with said cylinder and having constant communication with the pulsation chamber, a plurality of check valves leading from the cylinder and normally closed by the column of water in the casing above said check valves, a plurality of check valves in said passage which are closed on the up stroke of the cylinder, the first mentioned check valves being opened on the up stroke of the cylinder, and a plurality of check valves in the pulsation chamber that open on the up stroke of the cylinder, the displacement of the water in the pulsation chamber being substantially equal to the displacement of the water in the cylinder by the stationary piston whereby on the up stroke of the cylinder water is discharged therefrom through the first named check valves against the column of water in the casing to effect a discharge of water from the column substantially equal to the amount of water discharged from the cylinder and whereby on the down stroke of the cylinder the latter is supplied with water from the pulsation chamber substantially equal in amount to that discharged from the cylinder on its up stroke.

3. The combination of a casing, a fixed head in the casing, a reciprocating cylinder embracing said head, a pulsation chamber, a trunk connected with the cylinder and forming the inner wall of said pulsation chamber and providing a passage between the pulsation chamber and said cylinder, a check valve in said passage, a check valve leading from said cylinder, and a check valve in the pulsating chamber, said passage coöperating with the check valve in the pulsation chamber to prevent water in the latter from being forced back into the well on the down stroke of the cylinder.

4. The combination of a casing, a fixed head in the casing, a reciprocating cylinder embracing said head, a combined inlet and outlet chamber secured to the reciprocating cylinder, a plurality of valves in the combined inlet and outlet chamber which lead from the cylinder, a trunk secured to the combined inlet and outlet chamber, a pulsation chamber whose inner wall is formed by said trunk, the trunk having constant communication with the pulsation chamber, a plurality of check valves between the trunk and the combined inlet and outlet chamber, and a plurality of check valves in the pulsation chamber, said check valves which lead from the cylinder and the check valves in the pulsation chamber being opened on the up stroke of the cylinder and the check valves between the trunk and the combined inlet and outlet chamber being closed on the up stroke of the cylinder, with the latter check valves opening and the other mentioned check valves closing on the down stroke of the cylinder, the trunk and the pulsation chamber check valves preventing the water taken into the pulsation chamber through its check valves on the up stroke of the cylinder from being forced back into the well on the down stroke of the cylinder and insuring its passage through the trunk and the valves between the trunk and combined inlet and outlet chamber to the cylinder on the down stroke of the latter.

5. The combination of a casing, a fixed head in the casing, a reciprocating cylinder embracing said head, a pulsation chamber, a passage between the pulsation chamber and said cylinder which has constant communication with the pulsation chamber and which forms the inner wall of the latter and which prevents water in the pulsation chamber and the trunk from being forced back into the well on the down stroke of the cylinder, a check valve leading from the cylinder, a check valve in the pulsation chamber, a check valve in said passage, and means for reciprocating the cylinder.

6. The combination of a casing, a fixed head in the casing, a reciprocating cylinder embracing said head, a pulsation chamber, a passage connecting the pulsation chamber with said cylinder and having constant communication with the pulsation chamber and movable with the cylinder, a check valve in the pulsation chamber for coöperation with said passage to prevent the water in the pulsation chamber from being forced back into the well on the down stroke of the cylinder, a check valve leading from the cylinder, and a check valve in said passage.

7. The combination of a casing, a head in the casing, a reciprocating cylinder embracing the head, means for reciprocating the cylinder, a valved pulsation chamber to receive water from the well, the displacement of the water in the pulsation chamber being substantially equal to the displacement of the water in the cylinder by the stationary piston, a valved passage connecting the pulsation chamber with said cylinder and having constant communication with the pulsation chamber, and a valved outlet leading from the cylinder.

8. The combination of a casing, a working cylinder in the casing, means for operating the cylinder, a pulsation chamber, a valved communication between the pulsation chamber and the cylinder which has constant communication with the pulsation chamber, the displacement of the water in the pulsation chamber being substantially equal to the displacement of the water in the cylinder by the stationary piston.

9. The combination of a casing, a head in the casing, a reciprocating cylinder embracing the head, a pulsation chamber, a valve passage connecting the pulsation chamber with said cylinder, valves leading from the cylinder, valves in the pulsation chamber which open on the up stroke of the cylinder and close on the down stroke of the cylinder, said passage forming the inner wall of the pulsation chamber, said passage, said pulsation chamber and said valves in the pulsation chamber shielding the cylinder on its down stroke from the water in the well and means for reciprocating the cylinder.

10. The combination of a casing, a working cylinder in the casing, means for operating the cylinder to discharge water from the casing, means coöperating with the casing and the cylinder whereby the amount of water discharged from the casing is substantially equal to the quantity of water discharged from the cylinder, and a pulsation chamber, the displacement of the water in the pulsation chamber being substantially equal to the displacement of the water in the cylinder to supply the cylinder with substantially the same quantity of water as is discharged therefrom.

11. A pump including a casing provided with an internal shoulder, a support disposed on the shoulder, a plunger head whose rod is secured to said support and whereby the head is suspended in the casing, a reciprocating cylinder embracing the head, and a valved inlet and outlet chamber coöperating with the cylinder.

12. The combination of a casing, a fixed head in the casing, a reciprocating cylinder embracing said head, a pulsation chamber, a valved passage connecting the pulsation chamber with said cylinder, a check valve in the pulsation chamber for coöperation with said passage so as to cut off communication between the casing and the well on the down stroke of the cylinder, a check valve leading from the cylinder, and a check valve in said passage.

In testimony whereof I affix my signature in presence of two witnesses.

ERNST GERSTENBERG.

Witnesses:
E. W. LATIMER,
R. D. L. GRAVES.